United States Patent [19]

Habermehl, Jr. et al.

[11] Patent Number: 5,190,215

[45] Date of Patent: Mar. 2, 1993

[54] METHOD FOR CONTROLLING A BOILER

[75] Inventors: Robert Habermehl, Jr., Franklin; Norman M. Knauer; Alan L. Kwasneske, both of Milwaukee, all of Wis.

[73] Assignee: Habermehl-Knauer Controls, Inc., Franklin, Wis.

[21] Appl. No.: 785,281

[22] Filed: Oct. 30, 1991

[51] Int. Cl.⁵ .......................................... G05D 23/00
[52] U.S. Cl. .................................. 236/91 F; 165/16; 237/8 R
[58] Field of Search ............... 236/91 F; 237/8 R; 165/16

[56] References Cited

U.S. PATENT DOCUMENTS

| | | | |
|---|---|---|---|
| 2,265,512 | 12/1941 | Brown et al. | 236/91 F X |
| 2,602,591 | 7/1952 | Wilson et al. | 236/91 F |
| 2,719,672 | 10/1955 | Jenkins | 236/91 F X |
| 3,144,991 | 8/1964 | Marchant | 236/91 F X |
| 3,421,691 | 1/1969 | Forbes | 236/9 |
| 3,515,345 | 6/1970 | Barnd | 237/8 R X |
| 3,581,986 | 6/1971 | Magri | 236/91 F X |
| 4,298,943 | 11/1981 | Tompson et al. | 236/91 F X |
| 4,421,268 | 12/1983 | Bassett | 236/10 |
| 4,516,720 | 5/1985 | Chaplin | 237/8 R |
| 4,620,667 | 11/1986 | Vandermeyden et al. | 236/20 R |
| 4,637,349 | 1/1987 | Robinson | 236/91 F X |
| 4,667,874 | 5/1987 | Johnson et al. | 236/10 |
| 4,844,335 | 7/1989 | McKinley et al. | 236/91 F X |
| 4,941,609 | 7/1990 | Bartels | 236/78 D |
| 5,042,431 | 8/1991 | Shprecher et al. | 122/448.3 |

Primary Examiner—William E. Tapolcai
Attorney, Agent, or Firm—Jansson & Shupe, Ltd.

[57] ABSTRACT

The invention is an improved method for controlling a boiler used in a building space heating system. Certain control parameters such as outdoor ambient temperature and return line water temperature are monitored and boiler firing and quiescence are controlled as a function of a combination of water and ambient temperatures. This helps limit the time required to bring the system up to operating temperature. In general, the lower the ambient, the higher will be the return line water temperature which will initiate firing. And there are combinations of such temperatures at which the boiler is maintained quiescent notwithstanding a call for heat and other combinations at which the boiler is fired in the absence of a call for heat. Several control routines are disclosed.

27 Claims, 3 Drawing Sheets

FIG.4 ive method has been developed in consideration of both energy conservation and building occupant comfort. It recognizes that persistent low room temperatures are unacceptable even though a great deal

METHOD FOR CONTROLLING A BOILER

FIELD OF THE INVENTION

This invention is related generally to boiler controls and, more particularly, to a method for controlling a boiler used for space heating within a building.

BACKGROUND OF THE INVENTION

Many commercial buildings, e.g., hotels, office buildings and the like, have a hydronic heating system which includes a boiler (or, more typically, plural boilers)—the source of heat—and a steam/hot water circulating system delivering heated water into heat radiators in the building rooms. A boiler has a burner exhaust stack and an outer "shell" or housing containing water with heat distribution tubes immersed therein. Each boiler has a nominal maximum shell temperature at a nominal operating pressure and a characteristic stack temperature below which the boiler is able to absorb heat. Often, such boilers are fired using fuel oil or natural gas.

A common example of an older type of boiler heating system uses cast iron heat radiators. Newer systems use base board radiators. There are many such systems in service and a large percentage of them were installed when there was little concern about the cost of energy.

Such systems may have one or more heating "loops," each consisting of a hot water or steam output header from the boiler, one or more heat-dissipating radiators and a water return line to the boiler. In operation, very hot water or steam is pumped out of the header to the radiators where it "gives up" much of its heat into the space. The resulting cooler water flows along a return line back to a collection tank and thence to the boiler for reheating.

In systems having two or more heating or flow loops, a zone control valve is often installed in each loop. Such an arrangement permits separate control of the temperature in each zone in that, typically, a zone valve is opened to permit hot water flow only if that particular zone is "calling" for heat. A user-manipulated thermostat or temperature sensor with programmed set point initiates such a call when the actual temperature is at or below the set temperature.

As furnished by the manufacturer, boilers typically have two "firing rates," i.e., burner heat output rates such as exemplary rates of 300,000 and 800,000 BTU rates. Of course, the actual firing rates depend upon the size and configuration of boiler and other factors. Firing rate is controlled by controlling the flow of fuel to the burner using a butterfly or other type of gas valve.

Designers of boiler-driven hydronic heating systems have only superficially considered energy management (an environmental concern) and occupant comfort when configuring system control techniques—and such techniques are usually relatively crude. Simply stated, most such systems may be characterized as being of the on-off "brute strength" type. There is little attempt at energy conservation.

And that is not all. Existing control systems frequently fire a boiler at a firing rate which is excessive in view of the then-existing boiler water temperature. At water temperatures below about 160° F., firing rate must be carefully controlled to avoid cracking boiler tubing. Even a so-called "low" firing rate can crack such tubing under certain conditions. In fact, "overfiring" a cooled boiler is the primary cause of boiler failure.

The device described in U.S. Pat. No. 4,516,720 (Chaplin) is based on the proposition that greatest efficiency results when a heating system is operated at or near 100% of the time. The Chaplin device adjusts the initial output temperature of the heat-carrying fluid, e.g. water, as a function of outdoor ambient temperature and of the percentage of time that a space thermostat is at or below a set point or "call for heat" temperature.

The temperature of the heat-carrying fluid is progressively adjusted upward until the space thermostat calls for heat a high percentage of the time, 90-95% as a practical matter. This condition represents an approximate balance between heat output from the system and heat dissipation into the space.

U.S. Pat. No. 4,941,609 (Bartels et al.) describes a method and apparatus for controlling firing rate. A parameter used for such control is a "thermal mass" figure which is a numerical indication of the heat absorbing capability of the boiler. Another parameter is an operator-input figure denoting the "tightness" or "looseness" with which temperature control is to be achieved. Apparently, this is merely another way of denoting the bandwidth of the temperature excursions which will be permitted to occur in the space. As assumed examples (which do not expressly appear in the patent), a "tight" mode of control may permit a 3° F. bandwidth while a "loose" mode of control made permit an 8° F. bandwidth.

U.S. Pat. No. 3,421,691 (Forbes) describes a system having a heat sink separate from (and in addition to) the system boiler. The temperatures of the heat sink and of the boiler water are used as parameters to control boiler firing rate to more slowly increase the temperature of the water circulating in the heating loops.

Clearly, there is a need for a new method for boiler control which can effect significant system operating savings while yet retaining an acceptable level of heating comfort and avoiding overly aggressive firing of a cool boiler.

OBJECTS OF THE INVENTION

It is an object of this invention to provide an improved method for controlling a boiler which overcomes some of the problems and shortcomings of methods of the prior art.

Another object of this invention is to provide an improved method for controlling a boiler wherein energy conservation factors influence the control strategy.

Another object of this invention is to provide an improved method for controlling a boiler wherein additional boiler firing rates can be used along with those selected by the boiler manufacturer.

Still another object of this invention is to provide an improved method for controlling a boiler wherein other control parameters, in addition to boiler firing rate, are used to develop control strategies or routines. These and other important objects will be apparent from the following description taken in conjunction with the drawing.

SUMMARY OF THE INVENTION

The inventive method has been developed in consideration of both energy conservation and building occupant comfort. It recognizes that persistent low room temperatures are unacceptable even though a great deal of energy is saved. It also recognizes that there are times and ways in which room temperature can be reduced with little impairment of comfort. In other words, the method strikes a balance between energy conservation and building occupant comfort. It assumes that one or more temperature sensors (or thermostats if occupant temperature set point control is provided) are installed in the space or the zones to be heated. Temperature sensors are used in installations where control of temperature is by a computerized controller, usually remotely located. To put it another way, computerized control of space temperature in a larger building is often "taken away from" the occupant and exercised by the building manager or the like. In such an instance, the desired space temperature (which can be changed by the manager or other controller operator) is established in the computer as a "set point." The new method is preferably carried out using a computerized controller.

In a building space heating system having a boiler and a water return line, the improved method for controlling the boiler includes the steps of monitoring control parameters including ambient temperature exterior the building and the temperature of water in the return line. Boiler firing and quiescence are controlled as a function of a combination of return water and ambient temperatures.

More specifically, the boiler is controlled to fire at a water temperature generally inversely related to the ambient temperature. That is, the lower the ambient temperature, the higher the return water temperature which will initiate firing. For example, if the outdoor ambient temperature is 55° F., the return line temperature may be permitted to fall to a temperature as low as 70° F. On the other hand, if the ambient temperature is between, say, 10°-15° F., boiler firing will be initiated when the return line water temperature declines to, say, 120° F. A highly preferred method includes firing the boiler when return water and ambient temperatures are at some predetermined combination of values even though (in colder weather) there is not then a call for heat. In warmer weather (and assuming some predetermined combination of water and ambient temperature), the boiler is maintained quiescent notwithstanding a call for heat.

This routine limits the time required to bring the system to operating temperature and effectively deliver heat so that in colder weather (when space temperature drops more rapidly) no inordinate delay will occur between a call for heat and the actual delivery of heat to the space.

Boiler firing rate may also be controlled. Assuming the boiler has high and intermediate firing rates, the boiler is fired at its high rate when ambient temperature is below a preselected moderate temperature. The intermediate firing rate is used when ambient temperature is above such preselected temperature but below a preselected high temperature.

In another aspect of the method, it is assumed the building includes a heating zone having at least one temperature sensor and the zone temperature is controlled at a set point. The controlling step includes the steps of determining whether the ambient temperature is above or below a preselected high temperature and detecting the zone temperature. Boiler firing is initiated when the ambient temperature is below the preselected high temperature and the zone temperature is equal to or less than the set point temperature. The boiler is quiescent when ambient temperature is above the preselected high temperature.

Another unique feature of the method is its approach to space temperature computation. It recognizes that the temperature may vary at different locales within a zone. The zone includes plural temperature sensors and the zone temperature is computed in view of plural sensed temperatures.

Such computation is by identifying one of the sensors as the "lead" sensor and comparing it with the temperature detected by a second sensor. If the temperature sensed by the second sensor is within a certain percentage of that sensed by the lead sensor, the sensed temperatures are averaged. The process continues until all sensors are included. There are provisions for ignoring a sensor involving an apparently-aberrant temperature. Depending upon building cross-sectional shape, it may be desirable to "divide" the zone into quadrants and place a temperature sensor in each quadrant. And an enhancement of the new method involves monitoring wind direction and velocity since such information may be used, for example, to anticipate heating requirements in certain parts of the building.

In another unique aspect, the improved method is applied in dual-zone buildings. If only one zone is calling for heat, the other zone may also require heat soon. And for whatever reason, e.g., an inadvertently open window, a particular zone may be absorbing (and dissipating) heat at an unusual rate.

A zone control routine comprises the steps of initiating boiler firing in response to the call for heat, opening both zone valves (even though only one zone called for heat) and monitoring the temperature of water in each return line. The zone valve is closed in that loop having the higher return line water temperature if the difference in return line water temperatures exceeds a predetermined value. This approach prioritizes transfer of heat to that zone having the lower return line water temperature.

Another aspect of the inventive method includes the steps of monitoring the actual boiler shell and stack temperatures, monitoring an override parameter (such as return line water temperature) and regulating the boiler firing rate as a function of the actual temperatures of the shell and the stack. This "routine" can reduce the amount of heat wasted. Where either the actual shell or stack temperature exceeds the nominal maximum shell temperature or characteristic stack temperature, respectively, and the override parameter is above the preselected value, the boiler firing rate is regulated to a rate between the rates set by the boiler manufacturer. Reducing the boiler firing rate is by controlling the gas valve drive motor and attached valve to a position of reduced gas flow.

If the actual stack temperature exceeds its characteristic temperature but the override parameter is below a preselected value, the latter fact indicates the space is still capable of relatively rapid heat absorption. In such instance, the boiler firing rate is maintained notwithstanding the actual temperature of the stack exceeds its characteristic temperature. However, if the actual shell temperature is above its nominal maximum temperature, the boiler firing rate is reduced notwithstanding the override parameter is below the preselected value.

To effect further economies while yet avoiding significant impairment of comfort, the new method defines normal work days to have prime and non-prime heating hours. Prime hours are defined as those when persons are normally present in the building, e.g., upon waking and prior to departure for work and upon returning from work but before retiring. Non-prime heating hours are those during the day when most persons are at work and during sleeping hours. As to weekends, prime hours can be defined as the conventional waking hours, e.g., 7 AM to 10 PM and non-prime hours as all others.

While controlling temperature in view of prime and non-prime hours is known, the method effects such control in a unique way. Such preferred method includes the steps of determining the actual time of day and day of week, monitoring the actual temperature in the zone and terminating boiler firing if (a) the zone temperature is at or above the set point, (b) the return line water temperature exceeds a predetermined value and the actual time falls within prime heating hours, *or* terminating boiler firing if (a) the return line water temperature exceeds a predetermined value and (b) the actual time falls within non-prime heating hours. It will be noted that the zone temperature is not a factor in terminating boiler firing during non-prime heating hours. This approach is configured on the assumption that many or most occupants have retired. Of course, the method can include a provision whereby boiler firing is not terminated during non-prime hours if the actual zone temperature is at or below some relatively low, preselected "alarm" temperature (e.g., 45° F.) to avoid freezing pipes or the like.

Readers have undoubtedly experienced situations where, in buildings with hydronic heating systems, hot water is suddenly circulated through a relatively cool heating loop. This is usually accompanied by creaking and banging sounds and, in an extreme case, the thermal "shock" may even crack a pipe. The preferred method includes a routine for "gentle" startup. The boiler firing control step includes the steps of opening the zone valve prior to initiating boiler firing, delivering warm boiler water to the flow loop and then initiating boiler firing, desirably after a brief time delay. The flow loop is thereby tempered with warm water and a good deal of distracting noise is avoided.

The method can also be used in monitoring functions. For example, a boiler shell temperature sensor is mounted on the shell slightly below the line of normal water level in the boiler. If the water level is maintained at such level, the sensed temperature will not exceed the nominal maximum shell temperature which is substantially equal to the temperature of the water in the shell. If such sensed temperature exceeds the nominal maximum shell temperature, an alarm signal is annunciated since such a temperature rise indicates that portion of the shell is no longer in contact with water.

It is widely believed that the biggest factor in premature boiler failure is aggressively "hitting" a relatively cool boiler with a high rate of heat input. Such thermal shock results from initiating boiler firing at the maximum rate set by the manufacturer, irrespective of boiler shell temperature. In another aspect of the invention, a monitoring step includes monitoring shell temperature and the boiler firing control step includes the step of restricting the boiler firing rate to an intermediate rate if the shell temperature is below a predetermined value. Substantial thermal shock is avoided, thereby improving boiler life.

The boiler burner fuel/air mixture is set by the boiler manufacturer and normally need not be adjusted. It has been found that this fuel/air ratio (and therefore burner efficiency) can change with changes in the ambient temperature of the room in which the boiler is installed. To help maintain efficiency, the characteristic stack control temperature (an operator-selected value in the control program) is modified. The method includes the steps of predetermining a nominal room temperature and monitoring the actual room and stack temperatures. The boiler firing control step includes the step of terminating boiler firing if the actual stack temperature exceeds its characteristic control temperature by a temperature increment greater than the temperature increment between the nominal and actual room temperatures.

The new method also introduces attractive possibilities for remote supervisory monitoring and control of boiler operation. Parameter monitoring is performed at a location remote from the building in which the boiler is installed. The monitored control parameters include boiler shell and stack temperatures, the temperature of the building space(s), boiler water level and boiler pressure. The method includes selecting alarm values for boiler shell and stack temperatures and for boiler pressure and annunciating an alarm whenever a monitored parameter exceeds its alarm value. Alarm annunciation is at the remote site, at the building or both. And auto dialup can be incorporated to call supervisory and/or municipal emergency personnel.

A typical boiler installation requires period water replenishment and conditioning. The new method includes monitoring collection tank water level and a parameter relating to water condition and initiating addition of makeup water or water-conditioning chemicals to substantially maintain selected water level and condition.

Further details of the invention are set forth below.

DETAILED DESCRIPTIONS OF THE PREFERRED EMBODIMENTS

Background

Understanding of the various aspects of the new control method will be aided by an explanation of a typical system 10 using a boiler 11 for space heating.

Figure 1:
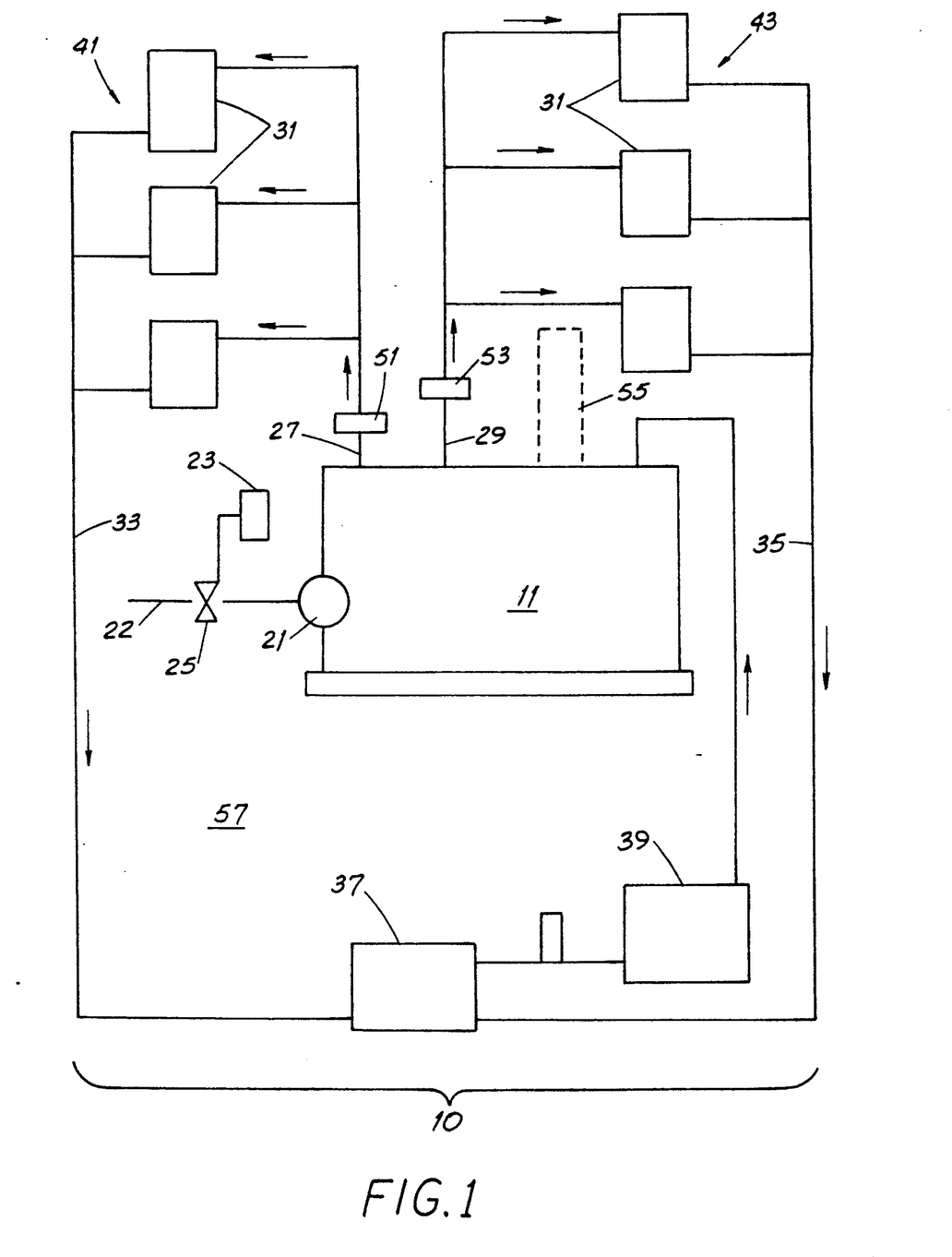
FIG. 1 is a representative schematic diagram of a plural-zone, boiler-type hot water heating system.
Figure 3:
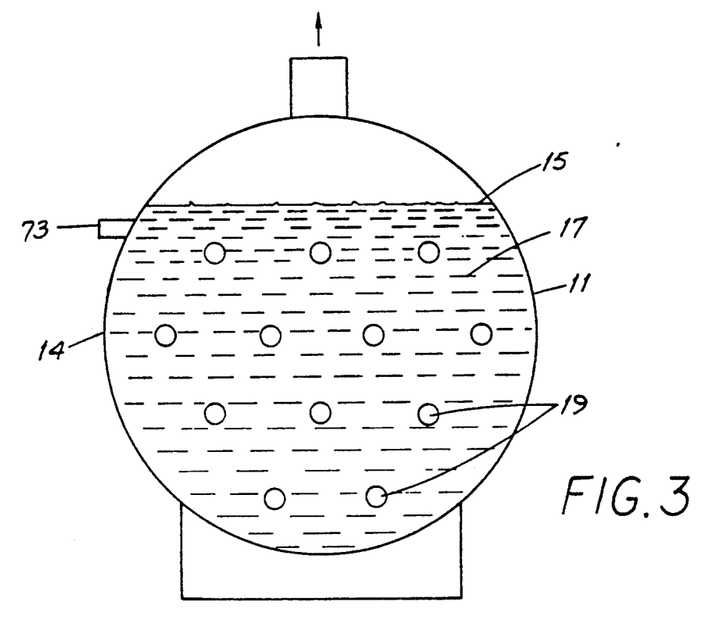
FIG. 3 is a front elevation view, in cross-section, of a portion of the boiler shown in FIG. 1.
Figure 4:
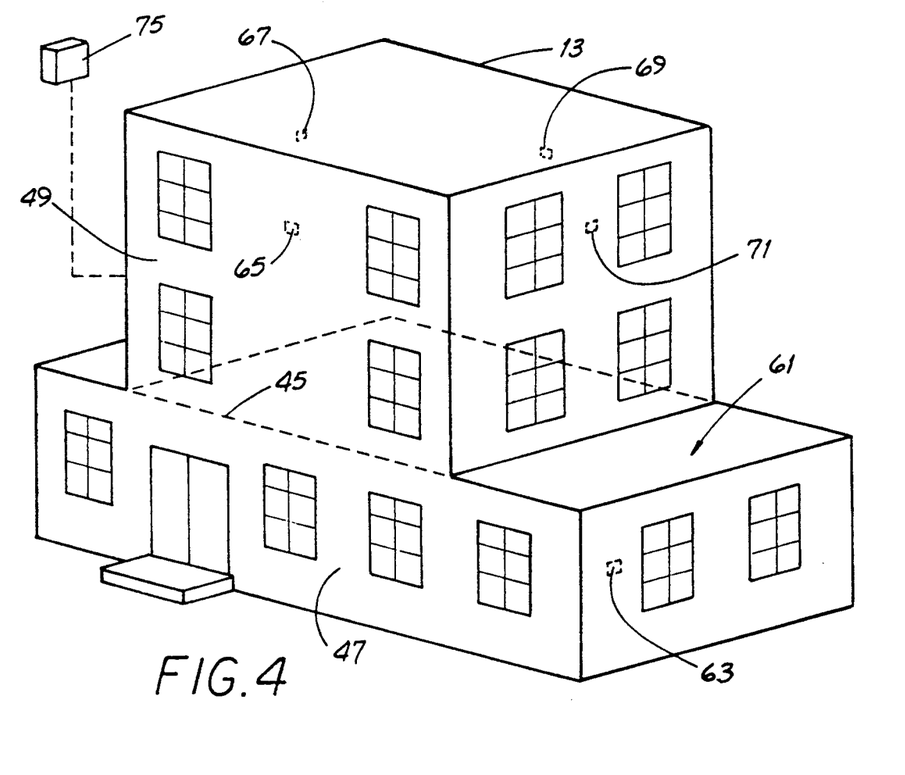
FIG. 4 is a representative perspective view of a building in which the system of FIG. 1 may be installed.

Referring to FIGS. 1, 3 and 4, the boiler 11 is usually installed in the basement of a commercial or industrial building 13 and a representative multi-story building 13 is illustrated. The boiler 11 comprises a large tank-like vessel with an outer shell 14 and filled to a water line 15 with water 17. Firing tubes 19 extend along the length of the boiler 11 and, at normal water level, such tubes 19 are immersed in water 17. A burner, 21 fueled by oil or natural gas for example, is mounted at one end of the boiler 11 and the burner 21, boiler 11 and tubes 19 are configured and arranged so that flames emanating from the burner 21 propagate down the tubes 19 and transfer heat to the surrounding water 17.

The burner fuel supply 22 is controlled by an electric modulator motor 23 mechanically coupled to a pivotably mounted butterfly valve 25, the position of which regulates the amount of fuel permitted to enter the burner 21. An air intake and mixing section (not shown) provides air so that the burner 21 has the proper fuel-air mixture ratio for all settings of the valve 25. When the burner 21 is off (valve 25 closed), it is referred to herein as being quiescent. The boiler manufacturer typically provides controls for setting a high and an intermediate firing rate (by butterfly valve setting) and for providing a start-up and shut-down sequence. Such controls also include aspects to prevent system over-temperature and over-pressure.

Connected to the boiler 11 are two headers 27, 29 each of which is in series with a parallel "circuit" of plural heating units 31 such as radiators, baseboard heaters or the like. The heating units 31 are connected to a return line 33, 35 by which water 17 returns to the collection tank 37 and thence to a makeup water tank 39 and back to the boiler 11. In the exemplary illustrated system 10, a header 27 or 29, heating units 31 and return line 33 or 35 comprise a flow loop or heating loop 41 or 43.

Such dual zone system 10 may be installed in the building 13 shown in FIG. 4. An exemplary arrangement for purposes of explanation includes that portion of the building 13 below the dashed line 45 as one zone 47 and that above such line 45 as another zone 49. Such dual zone system 10 has the capability of "delivering" heated water 17 to either set of heating units 31 to the exclusion of the other or to both sets simultaneously. Isolating zone valves 51, 53 are used to select which flow loop(s) 41 or 43 are so employed. A zone valve 51, 53 includes a small electric drive motor which is normally off (thereby blocking its header 27, 29) and which is turned on to open the header 27, 29 when heated water 17 is to be delivered by the particular loop. And of course there are times when both zone valves 51, 53 are off and no heated water 17 is being delivered to any heating unit 31. The boiler 11 also includes a stack 55 for removing burner exhaust gases from the boiler room 57 and the building 13.

Such an installation may be thought of as a very large heat "pump" or heat transfer system 10 in which heat is introduced into a boiler 11 by a flame, is captured there by the water 17 in the boiler 11 and is controllably delivered via heated water 17 to one or more spaces to be heated. Heat delivery is by pumping the heat-laden water 17 through the system 10 so that it gives up its heat in room radiators or heating units 31 and then returns to the boiler 11 at a much lower temperature for "heat replenishment." In a large installation, the boiler 11 can be quite sizeable—several feet in diameter and a few yards long. By knowing the temperatures of the outgoing and return water 17, one can get at least a rough idea of how much heat is being absorbed into the space.

Boilers 11 are designed to operate at some nominal maximum shell temperature and internal pressure. In one exemplary boiler 11, the nominal pressure is 2 p.s.i.g. and the nominal maximum shell temperature at that pressure is 217° F. For those portions of the shell 14 below the water line 15, shell temperature is substantially equal to the temperature of the water 17. And the stack 55 has a characteristic operating temperature which in the exemplary boiler is 267° F.

As to boiler operation, it is known that if the actual stack temperature is at or below its characteristic temperature, the boiler 11 is able to absorb heat. At stack temperatures above such characteristic temperature, the boiler 11 is no longer able to absorb heat and wasted heat is going up the stack 55, thereby raising stack temperature. And when firing of a cooler boiler 11 is initiated, such firing is at the highest available firing rate so that the system 10 can more quickly be brought to a temperature at which it can effectively deliver heat. As will become apparent from the description of the invention, such procedure materially shortens boiler life.

Water 17 flowing along the return line 33 or 35 enters a collection tank 37 where its quality is monitored. Since the system water is in contact with ferrous surfaces and is repeatedly heated and cooled, conventional boiler systems have provisions for water "conditioning," i.e., the addition of chemicals to the collection tank 37 to reduce system corrosion, lime deposits and the like. The foregoing is known technology and conventional boiler systems, like that described above, often control temperature rather crudely and can waste a great deal of heat.

Figure 2:
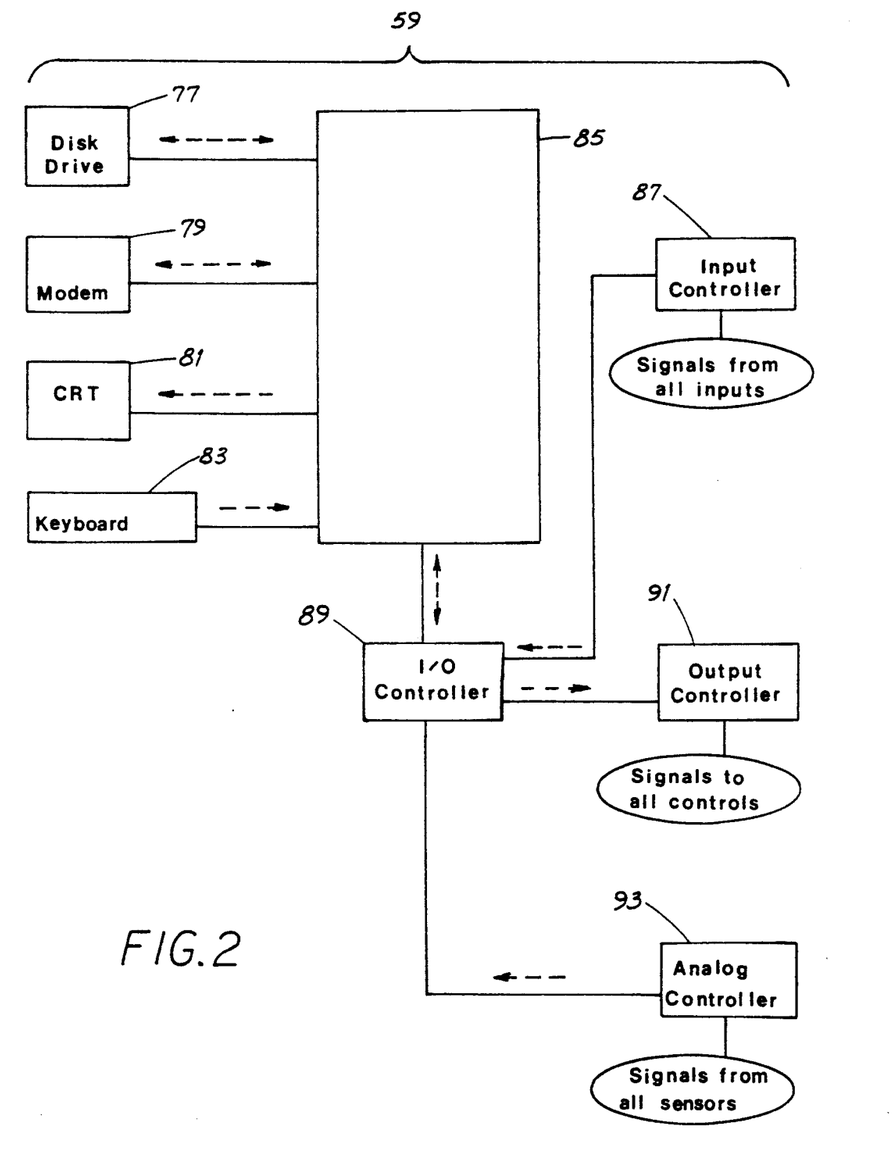
FIG. 2 is a schematic block diagram of a controller useful in carrying out the inventive method.

It is to be appreciated that the inventive method and the described controller 59 useful in carrying out such method do not change the basic features provided by the boiler manufacturer. For example, the standard high and intermediate firing rates are not changed (although the new method can use firing rates between such standard rates) nor are the standard burner start-up and shut-down sequences modified. To put it another way, the new method complements the standard boiler features by modifying how those features are employed in temperature control and energy conservation.

THE INVENTION

Turning next to the inventive method, certain aspects thereof are explained in connection with only one zone such as zone 47 since "one loop" or single zone systems 10 are relatively common. Other aspects are explained in connection with a dual zone system 10.

In a building space heating system 10 having a boiler 11 and a water return line 33, the improved method for controlling the boiler 11 includes the steps of monitoring control parameters including ambient temperature exterior the building 13 and the temperature of water 17 in the return line 33. Boiler firing and quiescence are controlled as a function of a combination of return water and ambient temperatures.

More specifically, the boiler 11 is controlled to fire at a return water temperature generally inversely related to the ambient temperature. That is, the lower the ambient temperature, the higher the return water temperature which will initiate firing. For example, if the outdoor ambient temperature is 55° F., the return line temperature may be permitted to fall to a temperature as low as 70° F. On the other hand, if the ambient temperature is between, say, 10°–15° F., boiler firing will be initiated when the return line water temperature declines to a higher temperature, say, 120° F. A highly preferred method includes firing the boiler 11 when return water 17 and ambient temperatures are at some predetermined combination of values even though (in colder weather) there is not then a call for heat. In warmer weather (and assuming some predetermined combination of water and ambient temperature), the boiler 11 is maintained quiescent notwithstanding a call for heat.

As the outdoor ambient becomes progressively colder, heat loss from the building 13 is more rapid. And space temperature continues to decline rapidly, even after a call for heat. The aforementioned control "routine" decreases the time required to return the system 10 to operating temperature and effectively deliver heat. In colder weather, no inordinate delay will occur between a call for heat and the actual delivery of heat to the space such as the space 61 within zone 47.

The boiler firing rate may also be controlled. Assuming the boiler 11 has high and intermediate firing rates, the boiler 11 is fired at its high rate when ambient temperature is below a preselected moderate temperature. The intermediate firing rate is used when ambient temperature is above such preselected moderate temperature but below a preselected high temperature. As used herein, the terms "moderate temperature" and "high temperature" imply no specific values and only mean that the latter exceeds the former. As examples, a moderate temperature may be in the 25-35° F. range and a high temperature in the 55°-65° F. range.

In another aspect of the method, it is assumed the building 11 includes a heating zone 47 having at least one temperature sensor 63 and the zone temperature is controlled to be maintained at a set point, 68° F. for example. The controlling step includes the steps of determining whether the ambient temperature is above or below a preselected high temperature and detecting the zone temperature. Boiler firing is initiated when the ambient temperature is below the preselected high temperature and the zone temperature is equal to or less than the set point temperature. The boiler 11 is quiescent when ambient temperature is above the preselected high temperature.

Referring further to FIG. 4, another unique aspect of the method is its approach to space temperature computation. It recognizes that the temperature may vary at different locales within a zone 47, 49. The upper zone 49 shown in FIG. 4 includes plural temperature sensors 65, 67, 69, 71, four sensors in the illustration, and the zone temperature is computed in view of the temperature sensed by each.

Such computation is by identifying one of the sensors, sensor 65 for example, as the "lead" sensor and comparing the temperature of a second sensor (such as sensor 67) with it. If the temperature sensed by the second sensor 67 is within a certain percentage of that sensed by the lead sensor 65, e.g., 5%, the sensed temperatures are averaged. The process continues until all sensors 65, 67, 69, 71 are included.

If one of the sensors 65, 67, 69, 71 is "out of range" with respect to the others (e.g., varies by more than 5%), its sensed temperature is considered to be an aberration and ignored. Depending somewhat upon building shape, it may be desirable to consider the zone 49 as having quadrants and place a temperature sensor in each quadrant. And an enhancement of the new method involves monitoring wind direction and velocity since such information may be used, for example, to anticipate heating requirements in certain parts of the building 13. In a building 13 which is not particularly "tight" against wind and the weather, information on wind direction and velocity would help explain why a particular sensor 65, 67, 69, 71 exhibited an unusual sensed temperature.

In another unique aspect, the improved method is applied in dual-zone buildings. If only one zone 47, 49 is calling for heat, the other zone 47, 49 may also require heat soon. And for whatever reason, e.g., a window inadvertently left open, a particular zone 47, 49 may be absorbing (and dissipating) heat at an unusual rate.

A zone control routine comprises the steps of initiating boiler firing in response to a call for heat, opening both zone valves 51, 53 (even though only one zone 47, 49 called for heat) and monitoring the temperature of water 17 in each return line 33, 35. The zone valve 51 or 53 is closed in that loop 41 or 43 having the higher return line water temperature if the difference in return line water temperatures exceeds a predetermined value. Such zone valve 51 or 53 remains closed until the difference in such temperatures becomes within the predetermined value. This approach prioritizes transfer of heat to that zone 47 or 49 having the lower return line water temperature.

Another aspect of the inventive method includes the steps of monitoring the actual boiler shell and stack temperatures, monitoring an override parameter (such as return line water temperature) and regulating the boiler firing rate as a function of the actual temperatures of the shell 14 and the stack 55. This "routine" can help avoid wasting heat. Where either the actual shell or stack temperature exceeds the nominal maximum shell temperature or characteristic stack temperature, respectively, and the override parameter is above the preselected value, e.g., 120° F., the boiler firing rate is reduced, preferably to a rate between the rates set by the boiler manufacturer, or the boiler 11 is shut down. Reducing the boiler firing rate is by controlling the gas valve drive motor 23 and attached valve 25 to a position of reduced gas flow.

An actual stack temperature in excess of its characteristic temperature indicates that the boiler 11 can no longer absorb heat and such heat is exhausted to atmosphere. On the other hand, an actual shell temperature in excess of its nominal maximum temperature necessarily means that boiler pressure has increased. This could signal a faulty pressure relief valve but in any event requires early attention.

If the actual stack temperature exceeds its characteristic temperature but the override parameter is below a preselected value, the latter fact indicates the space is still capable of relatively rapid heat absorption. In such instance, the boiler firing rate is maintained notwithstanding the actual temperature of the stack 55 exceeds its characteristic temperature. However, if the actual shell temperature is above its nominal maximum temperature, the boiler firing rate is reduced or the boiler 11 is shut down notwithstanding the override parameter is below the preselected value.

To effect further economies while yet avoiding significant impairment of comfort, the new method defines normal work days to have prime and non-prime heating hours. Prime hours are defined as those when persons are normally present in the building such as upon waking and prior to departure for work and upon returning from work but before retiring (e.g., 6:30 AM to 8:00 AM and 5:30 PM to 10 PM). Non-prime heating hours are those during the day when most persons are at work and during sleeping hours. As to weekends, prime hours can be defined as the conventional waking hours, e.g., 7 AM to 10 PM and non-prime hours as all others.

While controlling temperature in view of prime and non-prime hours is known, the method effects such control in a unique way. Such preferred method includes the steps of determining the actual time of day and day of week, monitoring the actual temperature in the zone 47 or 49 and terminating boiler firing if (a) the zone temperature is at or above the set point, (b) the return line water temperature exceeds a predetermined value and the actual time falls within prime heating hours, *or* terminating boiler firing if (a) the return line water temperature exceeds a predetermined value and (b) the actual time falls within non-prime heating hours. It will be noted that the zone temperature is not a factor in terminating boiler firing during non-prime heating hours. This approach is configured on the assumption that many or most occupants have retired. Of course, the method can include a provision whereby boiler firing is not terminated during non-prime hours if the actual zone temperature is at or below some relatively low, preselected "alarm" temperature (e.g., 45° F.) to avoid freezing pipes or the like.

Readers have undoubtedly experienced situations where, in buildings 13 with hydronic heating systems, hot water 17 is suddenly circulated through a relatively cool heating loop 41 or 43. This is usually accompanied by creaking and banging sounds and, in an extreme case, the thermal "shock" may even crack a pipe. The preferred method includes a routine for "gentle" startup. The boiler firing control step includes the steps of opening the zone valve 47 or 49 prior to initiating boiler firing, delivering warm boiler water 17 to the flow loop 41 or 43 and then initiating boiler firing, desirably after a brief time delay. The flow loop 41 or 43 is thereby tempered with warm water 17 and a good deal of distracting noise is avoided.

The method can also be used in monitoring functions. For example, a boiler shell temperature sensor 73 is mounted on the shell 14 slightly below the line 15 of normal water level in the boiler 11. If the water 17 is maintained at such level, the sensed temperature will not exceed the nominal maximum shell temperature which is substantially equal to the temperature of the water 17 in the shell 14. If such sensed temperature exceeds the nominal maximum shell temperature, an alarm signal is annunciated since such a temperature rise indicates that such portion of the shell 14 is no longer in contact with water 17.

As noted above, an enemy of long boiler life is overly aggressive boiler firing. Initiating boiler firing at the maximum rate set by the manufacturer, irrespective of boiler shell temperature is particularly injurious to boilers. In another aspect of the invention, a monitoring step includes monitoring shell temperature and the boiler firing control step includes the step of restricting the boiler firing rate to an intermediate rate if the shell temperature is below a predetermined value such as 160° F.-180° F. Substantial thermal shock is avoided, thereby improving boiler life.

The boiler burner 21 fuel/air mixture is set by the boiler manufacturer and normally need not be adjusted. It has been found that this fuel/air ratio (and therefore burner efficiency) can change with changes in the ambient temperature of the room 57 in which the boiler 11 is installed. In the preferred method, the characteristic stack control temperature (pre-selected by the controller operator) is modified. The method includes the steps of predetermining a nominal room temperature such as 70° F. and monitoring the actual room and stack temperatures. The boiler firing control step includes the step of terminating boiler firing if the actual stack temperature exceeds its characteristic control temperature by a temperature increment greater than the temperature increment between the nominal and actual room temperatures.

For example, it is assumed that the predetermined nominal boiler room temperature is 70° F. and the stack characteristic control temperature is 267° F. It is also assumed that the actual boiler room temperature is 79° F. For those assumed values, the temperature increment between the nominal and actual room temperatures is 9° F. In the method, boiler firing is terminated if the actual stack temperature exceeds 276° F. (267° F. plus 9° F.). On the other hand, boiler firing continues if the actual stack temperature is equal to or less than 276° F. in the example.

The new method also introduces attractive possibilities for remote supervisory monitoring and control of boiler operation. Parameter monitoring is performed at a location remote from the building 13 in which the boiler 11 is installed. The monitored control parameters include boiler shell and stack temperatures, the temperature of the building space(s) 61, boiler water level and boiler pressure. The method includes selecting alarm values for boiler shell and stack temperatures and for boiler pressure and annunciating an alarm whenever a monitored parameter exceeds its alarm value. Alarm annunciation is at the remote site 75, at the building 13 or both. And auto dialup can be incorporated to call supervisory and/or municipal emergency personnel.

A typical boiler installation requires periodic water replenishment and conditioning. The new method includes monitoring the water level of the collection tank 37 and a parameter relating to water condition such as water hardness. If the water level or water condition parameter goes "out of range," addition of makeup water or water-conditioning chemicals is initiated to substantially maintain selected water level and condition.

In the foregoing, it is to be appreciated that values such as a temperature value which are "preselected" or "predetermined" are values which are entered in the boiler controller computerized memory by the controller operator. Values such as the nominal maximum shell temperature and the characteristic stack temperature are functions of boiler design and operating conditions, are established by the boiler manufacturer but are nevertheless entered in computerized memory. Such values are then compared to actual values and the controller 59 acts thereon in accordance with its computerized program.

Referring to FIG. 2, the following describes specific hardware used to construct the system shown therein. However, it is to be clearly understood that the components identified below are merely exemplary and that other components may be substituted.

| The Function | The Equipment |
|---|---|
| 1.44 megabyte disk drive (77) | Toshiba ND3561GR |
| 2400 baud modem (79) | Everex Internal Modem |
| Cathode Ray Tube (81) | MGA Monochrome Monitor |
| Keyboard (83) | Keytronics Model 101 |
| 80286 Computer 12 MHz Clock and one megabyte memory (85) | Model G2 '286 Turbo Mainboard |
| Input Controller (87) | Metrabyte MSSR-32 |
| I/O Controller (89) | Metrabyte MDB64 |
| Output Controller (91) | Metrabyte MSSR-32 |
| Analog Controller (93) | Metrabyte MAI-16 |

While the principles of this invention have been described in connection with specific embodiments, it should be understood clearly that these descriptions are made only by way of example and are not intended to limit the scope of the invention.

We claim:

1. In a building space heating system having means to initiate a call for heat, a boiler and a water return line, an improved method for controlling the boiler including the steps of:

monitoring control parameters including ambient temperature exterior the building and the temperature of water in the return line;

controlling boiler firing and quiescence as a function of a combination of water and ambient temperatures; and, notwithstanding a call for heat, maintaining the boiler quiescent in the event the actual ambient temperature is above a pre-determined ambient temperature.

2. The method of claim 1 wherein the boiler has high and intermediate firing rates and the boiler is fired at its high rate when ambient temperature is below a preselected moderate temperature.

3. The method of claim 1 wherein the boiler has high and intermediate firing rates and the boiler is fired at its intermediate rate when ambient temperature is above a preselected moderate temperature.

4. The method of claim 1 wherein the boiler is controlled to maintain quiescence when ambient temperature is above a preselected high temperature.

5. The method of claim 1 wherein the building includes a heating zone having at least one temperature sensor, the zone temperature is controlled at a set point and the controlling step includes the steps of:

determining whether the ambient temperature is above or below a preselected high temperature;

detecting the zone temperature; and, initiating boiler firing when the ambient temperature is below the preselected high temperature and the zone temperature is equal to or less than the set point temperature.

6. The method of claim 5 wherein the heating zone includes plural temperature sensors and the zone temperature is computed in view of plural sensed temperatures.

7. The method of claim 6 wherein the heating zone has quadrants and a temperature sensor is mounted in each quadrant.

8. The method of claim 1 wherein:

the building includes two heating zones each having at least one temperature sensor and a flow loop including a zone valve and a water return line;

the temperature of each zone is controlled at a set point and a zone is calling for heat;

and the method includes a zone control routine comprising the steps of:

initiating boiler firing in response to the call for heat;

opening both zone valves;

monitoring the temperature of water in each return line; and, closing the zone valve in that loop having the higher return line water temperature if the difference in water temperatures exceeds a predetermined value, thereby prioritizing transfer of heat to that zone having the lower return line water temperature.

9. The method of claim 8 wherein the boiler has a nominal maximum shell temperature at a nominal operating pressure and a characteristic stack temperature below which the boiler is able to absorb heat and the method includes the steps of:

monitoring the actual boiler shell and stack temperatures; -monitoring an override parameter; and, regulating the boiler firing rate as a function of the actual temperatures of the shell and the stack, thereby reducing the amount of wasted heat.

10. The method of claim 9 wherein the boiler has plural firing rates set by the boiler manufacturer, the actual shell temperature exceeds the nominal maximum shell temperature, the override parameter is above the preselected value and the boiler firing rate is regulated to a rate between the set rates.

11. The method of claim 9 wherein the boiler has plural firing rates set by the boiler manufacturer, the actual stack temperature exceeds the characteristic stack temperature, the override parameter is above the preselected value and the boiler firing rate is regulated to a rate between the set rates.

12. The method of claim 10 wherein reducing the boiler firing rate is by controlling the gas valve drive motor and attached valve to a position of reduced gas flow.

13. The method of claim 9 wherein the override parameter is below a preselected value, and the boiler firing rate is maintained notwithstanding the actual temperature of the stack exceeds the characteristic temperature.

14. The method of claim 9 wherein actual shell temperature is above its nominal maximum temperature and the boiler firing rate is reduced notwithstanding the override parameter is below the preselected value.

15. The method of claim 13 wherein the override parameter is return line water temperature.

16. The method of claim 1 wherein the building includes a heating zone, the temperature of the zone is controlled at a set point, normal workdays are defined to have prime and non-prime heating hours and the method includes the steps of:

determining the actual time of day and day of week;

monitoring the actual temperature in the zone;

and either:

terminating boiler firing if (a) the zone temperature is at or above the set point (b) the return line water temperature exceeds a predetermined value and the actual time falls within prime heating hours, or:

terminating boiler firing if (a) the return line water temperature exceeds a predetermined value and (b) the actual time falls within non-prime heating hours.

17. The method of claim 1 wherein the building includes a heating zone with a flow loop and a zone valve and the boiler firing control step includes the steps of:

opening the zone valve prior to initiating boiler firing;

delivering warm boiler water to the flow loop and then;

initiating boiler firing whereby the flow loop is tempered with warm water.

18. The method of claim 1 wherein the boiler has a shell and a nominal maximum shell temperature and the method includes the steps of:

mounting a shell temperature sensor below the line of normal water level; and, annunciating an alarm signal if the sensed temperature exceeds the nominal maximum shell temperature.

19. The method of claim 1 wherein the boiler is installed in a room and includes a stack having a characteristic temperature, the method includes the steps of:

predetermining a nominal room temperature;

monitoring the actual temperature in the room;
monitoring the actual temperature of the stack; and
the boiler firing control step includes the steps of:
terminating boiler firing if the actual stack temperature exceeds its characteristic temperature by a temperature increment greater than the temperature increment between the nominal and actual room temperatures.

20. The method of claim 1 wherein the boiler has a shell, the monitoring step includes monitoring shell temperature and the boiler firing control step includes the step of restricting the boiler firing rate to an intermediate rate if the shell temperature is below a predetermined value, thereby improving boiler life.

21. The method of claim 1 wherein the boiler includes a shell and a stack, parameter monitoring is performed at a location remote from the building, the monitored control parameters include boiler shell and stack temperatures, the temperature of the building space, boiler water level and boiler pressure and the method includes the steps of:
selecting alarm values for boiler shell and stack temperatures and boiler pressure; and,
annunciating an alarm whenever a monitored parameter exceeds it alarm value,
whereby boiler operation is supervised from such remote location.

22. The method of claim 21 wherein the heating system includes a return water collection tank, the monitoring step includes monitoring collection tank water level and a parameter relating to water condition and the method includes the steps of:
initiating addition of makeup water or water-conditioning chemicals to substantially maintain selected water level and condition.

23. In a building heating system having a boiler and wherein:
the building includes two heating zones, each having at least one temperature sensor and a flow loop including a zone valve and a water return line; and,
the temperature of each zone is controlled at a set point and a zone is calling for heat;
an improved method for controlling the boiler including the steps of:
monitoring control parameters including ambient temperature exterior the building and the temperature of water in the return line;
controlling boiler firing and quiescence as a function of a combination of water and ambient temperatures;
and wherein the method includes a zone control routine comprising the steps of:
initiating boiler firing in response to the call for heat; opening both zone valves;
monitoring the temperature of water in each return line; and,
closing the zone valve in that loop having the higher return line water temperature if the difference in water temperatures exceeds a predetermined value, thereby prioritizing transfer of heat to that zone having the lower return line water temperature.

24. The method of claim 23 wherein the boiler has a nominal maximum shell temperature at a nominal operating pressure and a characteristic stack temperature below which the boiler is able to absorb heat and the method includes the steps of:
monitoring the actual boiler shell and stack temperatures;
monitoring an override parameter; and,
regulating the boiler firing rate as a function of the actual temperatures of the shell and the stack.

25. In a building space heating system having a boiler and a water return line, an improved method for controlling the boiler including the steps of:
monitoring control parameters including ambient temperature exterior the building and the temperature of water in the return line; and,
controlling boiler firing and quiescence as a function of a combination of water and ambient temperatures,
and wherein the building includes a heating zone, the temperature of the zone is controlled at a set point, normal workdays are defined to have prime and non-prime heating hours and the method further includes the steps of:
determining the actual time of day and day of week;
monitoring the actual temperature in the zone;
and terminating boiler firing if:
(a) the zone temperature is at or above the set point
(b) the return line water temperature exceeds a predetermined value and (c) the actual time falls within prime heating hours,
or if;
(a) the return line water temperature exceeds a predetermined value and (b) the actual time falls within non-prime heating hours.

26. In a building space heating system having a water return line and a boiler with a shell and a nominal maximum shell temperature, an improved method for controlling the boiler including, in either order, boiler control activity and boiler annunciating activity, the boiler control activity including the steps of:
monitoring control parameters including ambient temperature exterior the building and the temperature of water in the return line; and,
controlling boiler firing and quiescence as a function of a combination of water and ambient temperatures;
and the boiler annunciating activity including the steps of:
mounting a shell temperature sensor below the line of normal water level; and,
annunciating an alarm signal if the sensed temperature exceeds the nominal maximum shell temperature.

27. In a building space heating system having a water return line and a boiler with a shell, an improved method for controlling the boiler including the step of:
monitoring control parameters including ambient temperature exterior the building, the temperature of water in the return line and the shell temperature;
controlling boiler firing and quiescence as a function of a combination of water and ambient temperatures; and,
restricting the boiler firing rate to an intermediate rate if the shell temperature is below a predetermined value.

* * * * *